United States Patent [19]

Michelet et al.

[11] Patent Number: 4,646,316

[45] Date of Patent: Feb. 24, 1987

[54] ELECTRIC CONNECTING DEVICE FOR CONTACTING A MOLTEN METALLIC MASS

[75] Inventors: Jacques Michelet, Longeville-les-Metz; Ghislain Maurer, Metz, both of France

[73] Assignee: Irsid, Saint-Germain-en-Laye, France

[21] Appl. No.: 749,235

[22] Filed: Jun. 27, 1985

[30] Foreign Application Priority Data

Jun. 27, 1984 [FR] France ............................... 84 10482

[51] Int. Cl.⁴ ............................................... H05B 7/00
[52] U.S. Cl. .......................................... 373/72; 373/36
[58] Field of Search ....................... 373/36, 37, 38, 72, 373/108

[56] References Cited

U.S. PATENT DOCUMENTS 3,634,588  1/1972  Steitz et al. ............................ 373/37
4,125,737  11/1978  Andersson ............................ 373/108
4,145,562  3/1979  Stenkvist ................................. 373/72

Primary Examiner—Roy N. Envall, Jr.
Attorney, Agent, or Firm—Pollock, Vande Sande & Priddy

[57] ABSTRACT

Electrical connecting device to be placed in contact with a molten metallic mass, comprising an elongated metallic body (5) introduced through the wall of a container, to be placed in contact with the metallic bath by one of its ends, the other end constituting a terminal portion (8) projecting to the outside of the container wall, a sleeve (9) made of good thermal and electrical conductive material surrounding and contacting the terminal portion, the sleeve being connected to a charged electrical source and cooled by circulation of a cooling fluid. The device is used when contact between an electrode and a molten mass is required, and eliminates the risk of tapping from excessive melting of the electrode.

11 Claims, 2 Drawing Figures

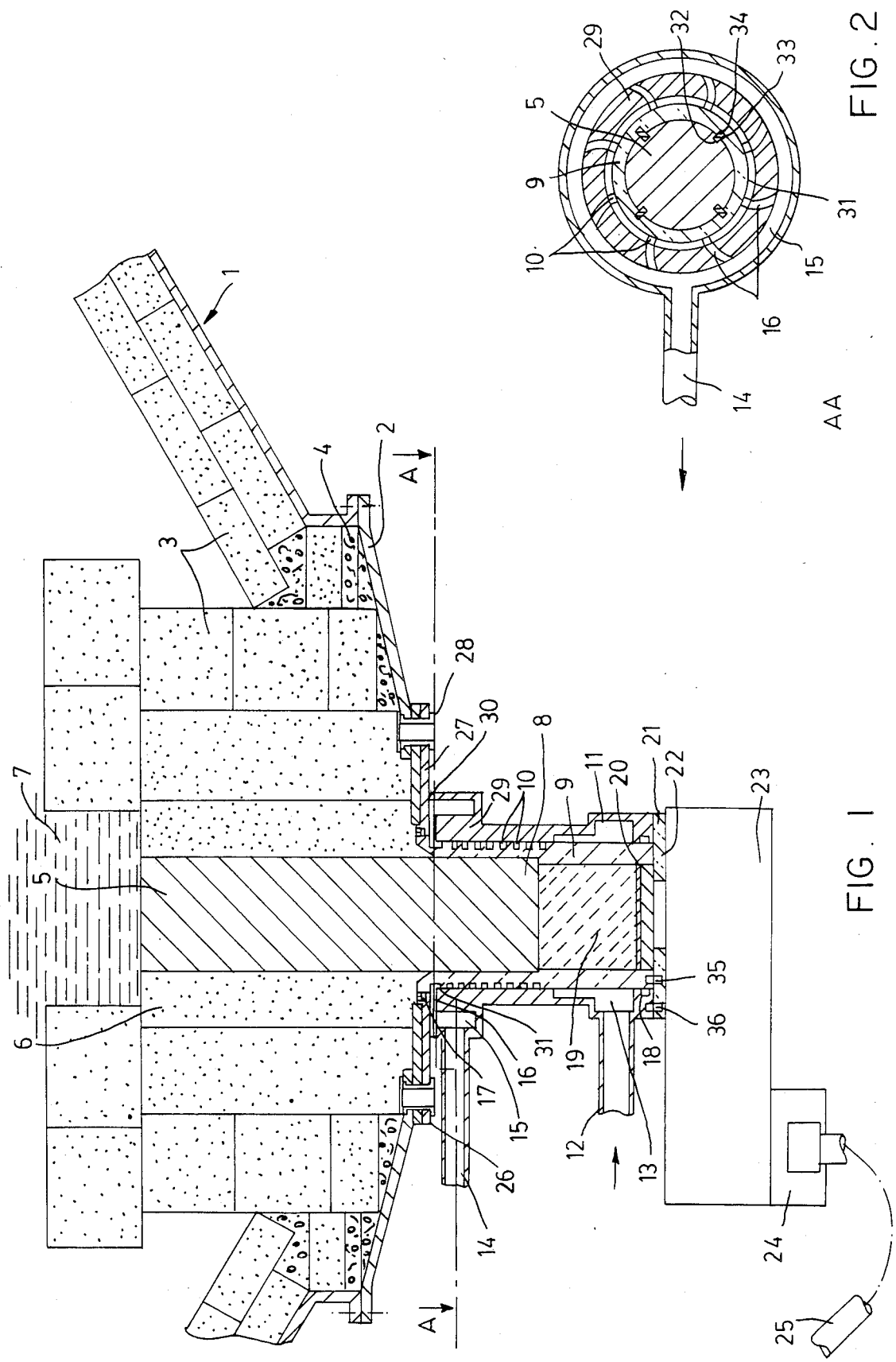

ELECTRIC CONNECTING DEVICE FOR CONTACTING A MOLTEN METALLIC MASS

FIELD OF THE INVENTION

The present invention relates to electrical connecting device to be placed in contact with a molten metallic mass, e.g., a steel bath.

BACKGROUND OF THE INVENTION

Devices of this type are sunk into the refractory cladding of a metallurgical container, generally in the bottom, for the purpose of proceeding with the treatment of the molten metal contained therein, by input of electrical energy. Such devices hence constitute electrodes connected at one end to a charged electrical source and in contact at the other end with a metallic bath, thereby assuring the passage of electric current to the bath.

Among metallurgical containers which may be equipped with such electrodes are electrolytic metallurgical vats for non-ferrous metals, such as aluminum, or in the metallurgy of iron and steel, ladles for treatment and temperature maintenance, or electric melting furnaces, particularly direct current arc furnaces capable of accepting electrical strengths in excess of 30,000 amperes without damage to the electrode.

One of the essential problems encountered by prior art devices is the behavior over time of the electrode whose terminal portion, in direct contact with the molten metallic mass, is subjected, in addition to the above-mentioned joule effect, to very severe thermic stresses due to the very high temperatures which, especially in the case of molten steel, can reach 1800° C. or even more.

Various methods of assuring satisfactory cooling of the electrode are known.

In a first group of such methods, cooling fluid is brought to the immediate vicinity of the hot end of the electrode. However, even a reduced degree of melting of the electrode involves the risk of destroying the cooling system, and hence a dangerous contact of the fluid with the liquid metal.

Another group of solutions, to which the present invention belongs, involves a cooling system external the electrode, located outside the metallurgical container. French Pat. Nos. 1,538,996 and 2,292,367 may be cited in this connection. While being safer, such solutions are not really satisfactory. The distance between the hot end of the electrode and its cooled end which passes to the exterior of the bottom of the container may be the cause of the final disappearance, through melting, of an excessive portion of the electrode, thereby compromising to a dangerous extent the leak-tightness of the container with regard to the molten mass which it contains.

OBJECT OF THE INVENTION

It is an object of the present invention to allow the passage of high intensity electric current while overcoming the disadvantages of prior art devices, and for this purpose it proposes a device capable of effectively resisting the danger of breakthrough arising from excessive melting of the electrode.

SUMMARY OF THE INVENTION

According to the invention, an electrical connecting device is located in the wall of a metallurgical container, preferably at the bottom thereof, and is brought into contact with a molten metallic mass by one of its ends, the other end passing to the outside of the container wall and being connected to a charged electrical source and cooled by a circulating fluid.

The device comprises (a) an elongated metal body of electro-conductive material, to be emplaced through the container wall in such manner that one of its ends contacts the molten metal mass and the other end constitutes a terminal portion projecting into the exterior of the container; (b) a sleeve of a thermally and electrically conductive material, surrounding and being in contact with this terminal portion and connected to a charged electrical supply source; and (c) means for cooling the sleeve through circulation of cooling fluid.

According to one embodiment, the metal body is a metallic bar, e.g., a steel billet, and the sleeve extends beyond the end of terminal portion of the bar to form a space inside the sleeve which is at least partly filled by a plug of refractory material which abuts the lower end of the bar.

The principle of the invention is put into practise by means of the sleeve, which assures indirect lateral cooling of the projecting terminal portion of the bar and a lateral electrical connection of the said portion. The indirect lateral cooling occurs through the interposition, between the projecting terminal portion of the bar and the coolant fluid, of a sleeve in contact with the bar.

In this manner, the sleeve plays the part of a bar-fluid cooling separator, which assures security of use. Moreover, the sleeve plays the part of a very effective thermal diffuser since, being mounted about the end of the bar, it helps to increase the thermal exchange surface with the cooling fluid without negative effect on the quality of such exchange.

As already stated, the electrical connection of the bar operates laterally through the intermediary of the sleeve; this results in a large contact surface with the bar over the entire length of its terminal portion.

To assure both its thermal and electrical function, the sleeve is made of a good heat and electrical conductor, such as copper or a copper alloy. This has several advantages. First, the assembly structure is simple and requires few parts. Secondly, mounting can proceed without difficulty. Moreover, because of the lateral cooling enabled by the sleeve, fusion of the non-cooled portion of the bar is extended to the cooled portion, tending to the formation of a stabilized liquid/solid interface (or fusion front) of conical shape, in the manner of a solidification pit well known in the continuous cooling process art.

In this way, the heavy elements, such as lead, which are inevitably present in melt charges, accumulate by force of gravity at the bottom of the pit and hence do not spoil the conditions for passage of the electrical current, which operates laterally.

Finally, in the case where the fusion cone extends all the way to the end of the bar, a refractory plug may be located in contact with this end as protection against the risk of axial tapping.

As regards the electrode cooling means, different configurations are possible.

In one embodiment, the sleeve is surrounded with slight spacing by a jacket so as to leave between them an annular space for the circulation of the cooling fluid. The jacket comprises inlet and outlet means for supplying the space with the cooling fluid. This cooling method is well known in the field of continuous casting molds for billets or blooms.

According to another embodiment, the circulation of cooling fluid takes place in at least one helical channel provided on the lateral outer surface of the sleeve. A jacket disposed about the sleeve assures the tight closure of the channel. This jacket is equipped with fluid inlet and outlet means which are both connected to the fluid refrigerant source and communicate with the ends of the channel(s).

BRIEF DESCRIPTION OF THE DRAWINGS

In order that the invention may be more clearly understood, reference will now be made to the accompanying drawings, in which an embodiment of the invention is shown for purposes of illustration, and in which:

FIG. 1 is a schematic cross sectional view of a continuous current arc furnace comprising an electrical connecting device according to the invention; and FIG. 2 is a section view along line A—A of FIG. 1.

DETAILED DESCRIPTION

FIG. 1 shows the bottom 1 of a direct current electric arc furnace formed mainly of a metallic shell 2 whose inside is cladded with bricks 3 of refractory material, the spacing left between the bricks being filled with a magnesian mortar 4. In addition, a free passage is left at the center of the bottom 1 of the furnace for the introduction of a steel billet 5 which, in this example, constitutes the hearth electrode bar according to the electrical device according to the invention. The space left between the upper part of billet 5 and bricks 3 is conventionally filled with a magnesium oxide dam 6.

The upper end of billet 5 is thus in contact with the molten metal 7, in this case steel. Preferably, a recess is arranged in the refractory material at the center of furnace bottom 1, for the purpose of encouraging the formation of a hot heel bath just above the upper end of billet 5. At the same time, billet 5 passes through shell 2 such that its terminal portion 8 passes to the outside of the furnace.

A sleeve 9 is mounted on portion 8 of the billet. According to the embodiment illustrated in FIG. 1, the assembly of sleeve 9 about terminal portion 8 of the billet is a longitudinal tenon-mortise type connection, which has the advantage of allowing differential expansion play between billet 6 and sleeve 9. As shown in FIG. 2, this is tenon-mortise assembly with a key, constituted by two longitudinal grooves 32 and 33, respectively located on the lateral outer surface of billet 5 and on the lateral inner surface of sleeve 9, and by a key 34 inserted in the space between these two grooves. Moreover, sleeve 9 is made of copper because of its thermal and electrical conductive properties, and comprises on its lateral outer surface eight helical channels 10 arranged side by side defining parallel cooling circuits, each passing entirely around the sleeve.

A jacket 11, made of metal in the present embodiment, is located tightly about sleeve 9 so as to assure closure of channels 10. Inlets and outlets for refrigerant fluid (which can advantageously be demineralized water) are provided on jacket 11 for supplying channels 10. In the example shown in FIG. 1, these are constituted at the lower end of jacket 11 by a water inlet conduit 12 reaching an annular chamber 13, and at the upper end of jacket 11 by water outlet conduit 14 issuing from an annular chamber 15. Channels 10 debouch at one of their ends into one or the other of these chambers, and thus define parallel cooling circuits. Thus, their lower ends debouch directly into chamber 13 and their upper ends communicate with outlet chamber 15 through the intermediary, first of an annular groove 31 and then of horizontal passages 16 curved in the direction of rotational movement of the water in channels 10.

Annular groove 31 is arranged in the upper portion of sleeve 9. The outlet end of channels 10 debouches in the base of this groove, which communicates with the concentric annular outlet chamber 15 through the intermediary of horizontal passages 16 arranged on the front surface of a thicker portion 29 of jacket 11 at its upper part. The closure of passages 16 is accomplished by jacket 11 coming into abutment against a base plate 26 (described hereinbelow), and a bead 30 assures solidarization of these two elements. In addition, as shown in FIG. 2, steel billet 5, or at least its terminal portion 8, as well as sleeve 9 and jacket 11, are of circular section.

Hydraulic leak-tightness is assured by O-rings 17 and 18 respectively located at the upper and lower ends of sleeve 9, in order to take account of the differential expansion phenomenon already discussed.

As a safety measure, means are also provided for preventing accidental leaks of liquid steel, especially when the water circulation in channels 10 is abnormally slow. These means comprise a plug 19 of refractory material located against the lower end of billet 5 in a housing through the lower end of sleeve 9, which, for this purpose, extends beyond terminal portion 8 of billet 5 for a distance of about 10 to 20 cm. Mounting is accomplished by locating successively against the lower face of plug 19 an asbestos insert 20 assuring thermal insulation, and then against this insert a steel closure plate 21. It will be noted that, while this is not essential, plug 19 is locatd below the cooling zone generated by the water circulation in channels 10.

The electrical supply for the device shown in FIG. 1 comprises a copper crown 22, attached by means of screws 35 and 36, respectively against the lower end of sleeve 9 and against the lower end of jacket 11. Crown 22 is surrounded by a copper casing 23 having one or more vertical ribs, also of cooper, generally referred to as "flag." To each flag is attached a plate 24, also of cooper, which is directly connected by a copper cable 25 to an electrical supply terminal (not shown). Because of the great electrical power transmitted by cables 25, these are preferably hollow so as to allow circulation of a refrigerant fluid, e.g., water.

The device according to the invention also comprises means for assembling the ensemble formed by sleeve 9 and jacket 11, under shell 2 and around billet 5. In the embodiment described, these means are constituted firstly by a base plate 26 solid with the upper part of jacket 11 due to bead 30, and functioning to assemble jacket 11 to base plate 26 with the interposition of an electrically insulating gasket 27. Passages are of course provided in base plate 26 and gasket 27 for the introduction of assembly bolts. In order to maintain electrical insulation of the furnace, an electrically insulating bush 28 is introduced into each such passage.

It will be understood that the invention is not limited to the embodiment described hereinabove. For example, channels 10 on the lateral outer surface of sleeve 9 may be longitudinal channels distributed over the entire periphery of sleeve 9. In another variant, these may be replaced by canals produced, for example by piercing, on the inside of the sleeve; in this variant, the jacket can be dispensed with. In a further variant, a single helical channel may be provided on sleeve 9.

Mounting of sleeve 9 about the terminal portion 8 of billet 5 may be secured by means other than the tenon-mortise arrangement described above, e.g., through brazing or screwing. In any event, assembly means permitting relative longitudinal displacement of the elements are preferred, so as not to run counter to the differential expansion phenomenon.

It is not essential for the contact between sleeve 9 and billet 6 to be assured over the entire periphery of the billet during mounting. In effect, it will be assured automatically by thermal expansion of the hot billet in the cold sleeve.

As for the electrical connection of the sleeve, there are possibilities other than the one described above, particularly a copper ring tightened about the sleeve and connected to an electrical source.

Finally, the invention is applicable to any installation involving a contact between an electrode and a molten mass, or, more generally, a molten mass and a metal bar where the passage of electric current is to be assured.

The application of the invention to molten steel arc furnaces, or similar furnaces, has considerable metallurgical advantages. In particular, at the end of melting, by switching off the electric current, a natural pneumatic stirring of the bath is obtained, very conducive to metal-slag exchanges, to thermal homogenization of the bath, etc.

This stirring phenomenon, resulting from the release of CO from the billet which liberates dissolved oxygen during resolidification under the cooling effect of the sleeve from the moment of cessation of the electrical supply, shown itself by vigorous swelling observable on the surface of the bath directly above the billet. Here we find a particularly attractive aspect of the invention, in which the billet plays the part of an effervescent steel mass which alternately melts and then resolidifies in accordance with the operating cycles of the furnace.

What is claimed is:

1. Electrical connecting device to be located in the wall of a metallurgical container, in contact by one of its ends with a molten metallic mass within said container and connected by its other end to an electrical supply source, said device comprising
   (a) an elongated metallic body (5) for emplacement through said container wall (2) in such manner that one of its ends contacts said molten metallic mass (7) and that its other end constitutes a terminal portion (8) projecting to the outside of said container;
   (b) a sleeve (9) of good heat and electrical conducting material surrounding and being in contact with only said terminal portion (8) of said metallic body, said sleeve being connected to an electrical supply source; and
   (c) means for cooling said sleeve (9) by circulation of a cooling fluid.

2. Device according to claim 1, wherein said terminal portion (8) and said sleeve (9) have circular cross sections.

3. Device according to claim 1, wherein said sleeve (9) is assembled to said terminal portion (8) by a longitudinal tenon-mortise type assembly.

4. Device according to claim 1, wherein said sleeve (9) extends beyond a lower end of said terminal portion (8), at least a portion of said extension being filled by a plug (9) of refractory material abutting against a lower end of said body (5).

5. Device according to claim 1, wherein said cooling means comprise a jacket (11) surrounding said sleeve (9) at a distance leaving an annular space (13) for the passage of refrigerant fluid, said jacket being provided with inlet means (12, 13) and outlet means (14, 15) connected to a source of refrigerant fluid for supplying said annular space.

6. Device according to claim 5, wherein said cooling means comprises at least one channel (10) in a lateral outer surface of said sleeve (9), in which said refrigerant fluid circulates, said inlet means (12, 13) and said outlet means (14, 15) being connected to the ends of said at least one channel.

7. Device according to claim 6, comprising a plurality of longitudinal said channels (10) distributed over the entire periphery of said lateral outer surface of said sleeve (9).

8. Device according to claim 6, comprising a single helical channel (10).

9. Device according to claim 6, comprising a plurality of helical channels (10) defining parallel cooling circuits.

10. Device according to claim 6, wherein said inlet means (12, 13) and said outlet means (14, 15) are respectively located at a lower end and an upper end of said jacket (11), said outlet means comprising an annular groove (31) surrounding said sleeve (9) and having an inner periphery communicating with an outlet end of said at least one channel (10) and an outer periphery connected to a concentric annular outlet chamber (15) through a plurality of horizontal passages (16) located in a front surface of a thicker portion (29) of said jacket at its upper part.

11. Device according to claim 10, wherein said upper part of said jacket (11) is terminated by a base plate (26) provided with means (27, 28) for fixing said jacket on a bottom wall of said metallurgical container, said means also assuring electrical insulation between a metallic shell (2) of said container and said sleeve (9).

* * * * *